Jan. 1, 1952
S. L. TERRY
2,581,217
LOCK WASHER
Filed Sept. 23, 1949
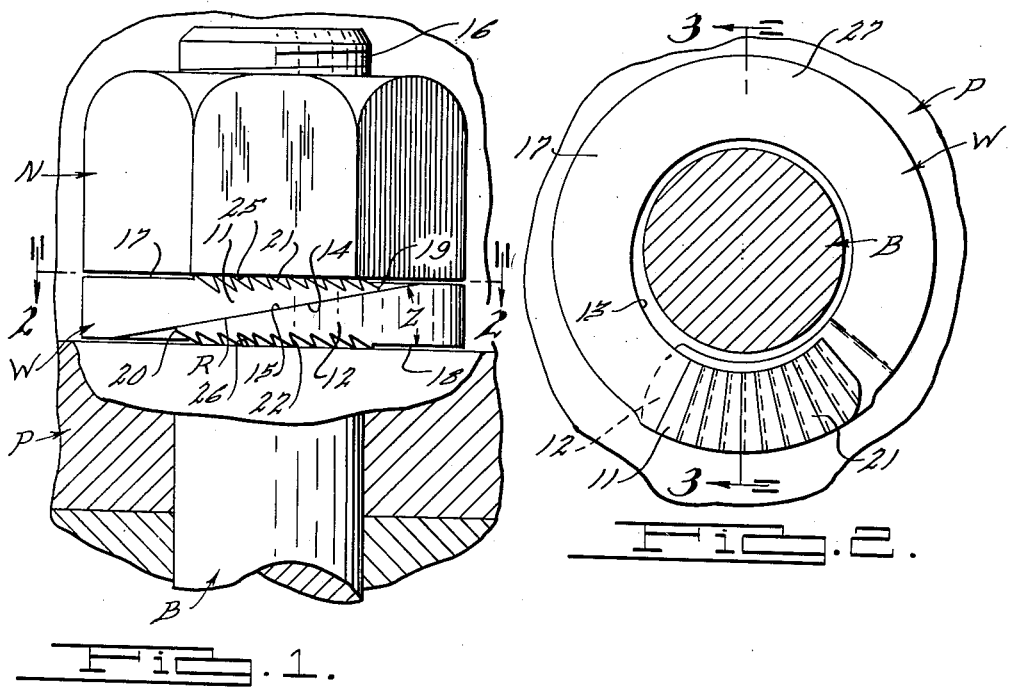
Fig. 1.
Fig. 2.
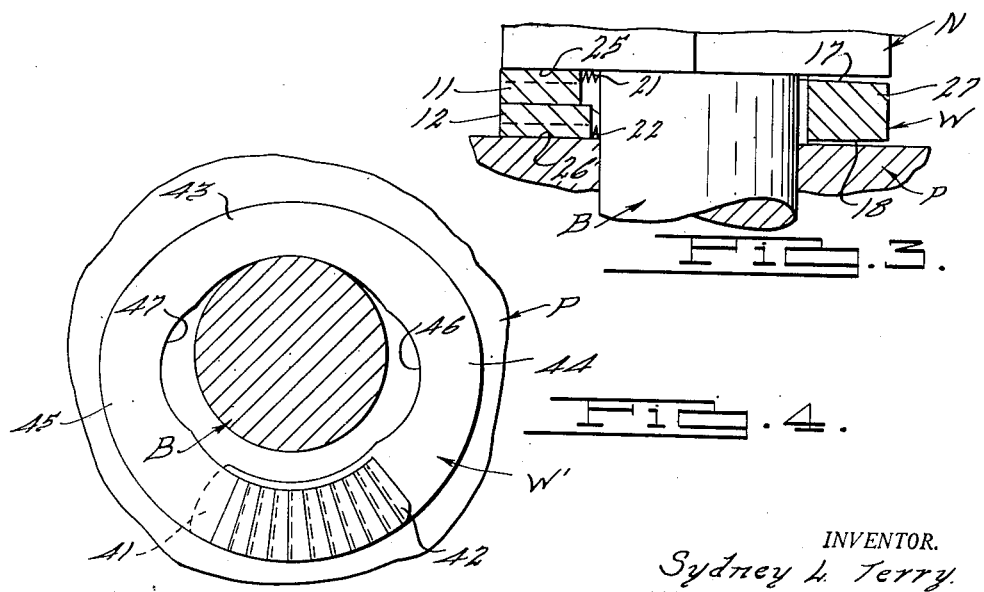
Fig. 3.
Fig. 4.
INVENTOR.
Sydney L. Terry.
BY
Harness and Harris
ATTORNEYS Patented Jan. 1, 1952

2,581,217

UNITED STATES PATENT OFFICE 2,581,217

LOCK WASHER

Sydney L. Terry, St. Clair Shores, Mich., assignor to Chrysler Corporation, Highland Park, Mich., a corporation of Delaware Application September 23, 1949, Serial No. 117,305

6 Claims. (Cl. 151—36)

This invention relates to lockwashers or so-called nut locks wherein a wedging ramp is provided on the lockwasher and arranged such that it cooperates with the exposed faces of the lockwasher in a manner that effectively resists any tendency of the associated nut to back off or unscrew itself from its threadably engaged bolt once the nut has been screwed up against the lockwasher. The arrangement of the ramp means is such that wedging forces are developed as the nut tends to back off the bolt and these wedging forces urge the nut into tighter engagement with the associated bolt and work piece. Accordingly, unintended or accidental displacement of the nut is prevented. As a result of the wedging action developed when the nut tends to back off of the bolt this lockwasher construction has the inherent property of requiring a breakaway torque for removing the nut of greater magnitude than the tightening torque used to apply the nut.

It is a primary object of this invention to provide a lockwasher or nut lock of simplified design that may be easily manufactured and installed and yet one that includes novel means for effectively restraining accidental or unintended removal of the nut from its associated bolt.

It is a further object of this invention to provide a lockwasher with an integrally formed wedging ramp that provides a means for controlling the breakaway torque required to unscrew the associated nut from its supporting bolt once the nut has been driven home against the lockwasher.

It is an additional object of this invention to provide a unitary lockwasher construction having integrally formed means for resisting unscrewing of the nut from the associated bolt and for controlling the breakaway torque required to release the nut from its associated bolt.

Other objects and advantages of this invention will become apparent from a reading of the attached specification and a consideration of the related drawings wherein:

Fig. 1 is a fragmentary side elevational view, partly in section, of a bolt and nut connection to a work piece that includes a lockwasher embodying this invention;

Fig. 2 is a sectional elevational view taken along the line 2—2 of Fig. 1;

Fig. 3 is a sectional elevational view taken along the line 3—3 of Fig. 2; and

Fig. 4 is a sectional elevational view similar to Fig. 2 but showing a modified form of the invention.

In Figs. 1-3 of the drawings a bolt B is connected to a work piece P by means of the nut N and lockwasher W. The lockwasher W and nut N are each mounted in conventional fashion on the threaded end of the bolt B that protrudes from the workpiece P.

The lockwasher or nut lock W that embodies this invention is a flexible, flat, ring-like, member provided with overlapping, disconnected ends 11 and 12 respectively. The bore 13 that pierces the lockwasher W is of such a size that the lockwasher fits loosely about the associated bolt B. The inwardly disposed faces 14 and 15 of the overlapping washer ends 11 and 12, respectively, are formed to have face to face engagement along the inclined plane or ramp R. To insure face to face engagement during flexing of the washer ends 11, 12 it is preferable to have the ramp R formed as a portion of a helix although a straight line configuration may be used satisfactorily.

The ramp surface R is arranged so that it will develop nut locking forces when there is any tendency of the nut N to back off of the bolt B. The angle Z of the inclined ramp R may be varied to control the breakaway torque of the nut as is subsequently explained but this angle must always be greater than the lead of the threads 16 of the bolt B in order to provide the desired nut locking effect.

The outwardly disposed faces 17 and 18 of the overlapping washer ends 11 and 12 include the radially extending ratchet teeth or serrations 21 22 respectively. It will be noted that the teeth 21 and 22 are sloped in opposite directions and arranged such that on clockwise rotation of the nut N to thread the nut on the bolt B, the end surface 25 of the nut N may slide across the washer teeth 21 and the washer teeth 22 may slide across the end surface 26 of the work piece P. However, when the nut N tends to rotate counterclockwise to back off of the bolt B, then the teeth 21 will dig into the nut end surface 25 and the teeth 22 will dig into the work piece surface 26. Consequently, relative rotation between the nut N, washer W and work piece P is restrained on any unscrewing movement of nut N.

From Fig. 1 it will be noted that the end edges 19 and 20, of the overlapping washer ends 11 and 12 respectively, do not extend to the points where the ramp surface R intersects the exposed side faces 17 and 18 of the washer. By terminating the end edges 19 and 20 inwardly of the exposed side faces 17 and 18 relative circumferential movement between the overlapping ends 11 and 12 is facilitated. This arrangement whereby the overlapping ends 11, 12 may move relative to each other when the nut N tends to back off the bolt B is an essential feature of this lockwasher for the relative circumferential movement of the ends 11 and 12 produces the nut locking action described in detail below.

From Fig. 2 it will be noted that the radially extending ratchet teeth or serrations 21, 22 on the exposed faces 17, 18 of the washer need extend along only a small circumferential portion of the washer adjacent each of the overlapping end edges 19, 20. Furthermore, the serrations 21, 22 are opposite the ramp formations 14, 15 on each end of the washer and if the washer is formed from strip material the serrations 21, 22 and ramp inclines 14, 15 may be formed at the same time after which the strip is bent to final circular form. This lock-washer construction is therefore economical and easy to fabricate by conventional machinery. The portions of the washer extending between the overlapping ends 11, 12 may be of a reduced width relative to the width of the ends to increase the flexibility of the washer for bending. The reason for the flexibility of the washer will become more readily apparent from the subsequent description of the operation of this lockwasher.

When the lockwasher W is mounted around the bolt B and the nut N is screwed up on the bolt B so as to compress the washer W between the nut N and piece P, it is thought to be obvious that the washer teeth 21 and 22 will be forced into engagement with the surface 25 of the nut N and the surface 26 of the work piece P. The shape of the teeth 21 and 22 is such as to permit the nut N to be tightened after original contact with the washer W. The teeth 21 and 22 permit the nut N to rotate clockwise relative to the washer W and the washer W may rotate clockwise relative to the work piece P. As the pressure increases between the nut, washer and work piece on increased tightening of the nut, there is a tendency for the teeth 21 to bite into the nut surface 25 and the teeth 22 to bite into the work piece surface 26 so that subsequent tightening of the nut N tends to move the overlapping free ends 11 and 12 apart or to expand them in a circumferential direction. This relative circumferential expansion of the washer ends 11, 12 on nut tightening amounts to an outwardly hinging movement of the washer ends about the diametrically disposed pivot or hinge portions 27 of the washer. In moving outwardly on nut tightening the overlapping ends 11, 12 of the lockwasher slide outwardly along the ramp surface R and tend to reduce the thickness of the lockwasher in the region of the overlapping ends. From Fig. 3 it is obvious that the normal thickness of the overlapping ends 11, 12 is slightly greater than the thickness of the diametrically disposed hinge or pivot portion 27 of the washer. Consequently, when the overlapping ends 11, 12 have been expanded sufficiently such that the thickness of the washer at the overlapped ends is equal to the thickness of the washer at the other points along its circumference, then outward hinging of the ends 1, 12 cease. This outward hinging movement of the washer ends 11, 12 on nut tightening tends to tension the washer so that the ends 11, 12 will be urged to contract towards each other at all times even though the nut remains stationary relative to the associated bolt. Accordingly, the tension forces set up in the washer on nut tightening movement urge the washer ends 11, 12 to contract towards each other circumferentially and this tends to slide the ends 11, 12 inwardly along the ram R in a direction that will develop wedging forces that act to more securely anchor the nut in its tightened position.

If variations in the bolt loading, or temperature changes, or the like, should develop stresses and strains between the threadably engaged portions of the bolt and nut such that the nut N tends to rotate in a counterclockwise direction and thereby back off the bolt B, the washer construction herein disclosed will effectively prevent such unintended or accidental displacement of the nut N. On any movement of the nut N in a counterclockwise direction the washer teeth 22 bite into the surface 26 of the work piece P and the washer teeth 21 bite into the end surface 25 of the nut N to thereby prevent relative rotation between the nut washer and work piece. Consequently, any movement of the nut N in a counterclockwise direction will circumferentially contract the overlapping ends 11, 12 of the washer about the bolt B. Contraction of the overlapping washer ends 11, 12 about the bolt B will move the ends 11, 12 inwardly along the ramp R in a direction that will urge the overlapping ends 11, 12 axially apart and this separating movement of the ends 11, 12 will more firmly wedge the nut, washer and work piece together and thereby anchor the nut N against unscrewing movement.

While the teeth 21, 22 are shown as the means for resisting relative movement between the nut, washer and work piece on unscrewing movement of the nut, this invention is not to be restricted to this particular construction. It is thought to be obvious that any means that will provide a coefficient of friction between the surfaces 17, 25 and 18, 26 that is greater than the coefficient of friction between the ramp surfaces 14, 15 will produce an operative lockwasher in accordance with the teachings herein provided the inclination of the ramp R is equal to or greater than the lead of the screw threads on the bolt B and nut N.

While variation in the angle or inclination Z of the washer ramp R provides one means for controlling the breakaway torque required to unscrew the nut from the bolt, the modified form of the invention shown in Fig. 4 discloses an additional means for controlling the breakaway torque. The washer W' shown in Fig. 4 is similar to that shown in Figs. 1–3 in that it includes overlapping, serrated ends 41, 42 having engageable interior faces that provide a ramp surface (not shown) similar to the ramp surface R of the Figs. 1–3 form of the invention. In this form of the invention the hinge portion 43 of the washer W' is reduced in width relative to the width of the washer ends 41, 42 to increase the flexibility of the washer for circumferential expansion and contraction of the overlapping washer ends 41 and 42. In addition, the portions 44, 45 of the washer intermediate the hinge portion 43 and the ends 41, 42 are formed with cut-outs 46, 47 along their inner side edges. The cut-outs 46, 47 permit increased circumferential contraction of the overlapping washer ends 41, 42 before the washer inner side edge portions seat against the sides of the bolt B. Engagement of the washer inner side edges with the bolt provides rigid reaction points that limit the contraction of the flexible washer ends and this restraint of movement of the washer ends limits the breakaway torque. The degree of cut-out at the portions 44, 45 of the washer will thus provide a means other than the ramp angle for controlling the breakaway torque.

From the above it is though to be obvious that the several washer constructions herein disclosed provide economical, highly efficient, simplified types of lockwashers or nut locks that will effectively prevent accidental or unintended release of a nut from the bolt with which the nut is threadably associated. Furthermore, the washer is a single unitary element that can not be incorrectly applied so that it will not function properly. To adapt this washer for left-handed threaded bolts and nuts it is merely necesary to reverse the angularity of the ramp incline and the direction of slope of the ratchet teeth.

I claim:

1. A lock washer adapted to be mounted on a threaded member comprising a split ring of flexible material having bevel cut, overlapping, end portions each of which is formed with opposed, inwardly and outwardly disposed faces, said inwardly disposed faces of the washer end portions being frictionally and slidably engageable along an inclined plane extending between the outwardly disposed faces of the lock washer wherein the plane inclination is in the same direction as but is of greater degree than the pitch of the threads of the threaded member on which the washer is mounted, said outwardly disposed faces of said washer overlapping end portions each including radially extending, serrated friction grip means adapted to be frictionally engaged with the surfaces of elements placed adjacent thereto, said washer having a thickness in an axial direction along the portions of overlapping ends that is slightly greater than the thickness of the washer at other locations around the circumference thereof, the condition of the said faces of the washer end portions being such that the coefficient of friction between said friction grip means and the material engaged therewith is greater than the coefficient of friction between the slidably engaged, inwardly disposed faces of the washer end portions.

2. A lock washer adapted to be mounted on a threaded member comprising a split ring of flexible material having bevel cut, overlapping, end portions each of which is formed with opposed, inwardly and outwardly disposed faces, said inwardly disposed faces of the washer end portions being frictionally and slidably engageable along an inclined plane extending between the outwardly disposed faces of the lock washer wherein the plane inclination is in the same direction as but is of greater degree than the pitch of the threads of the threaded member on which the washer is mounted, said outwardly disposed faces of said washer overlapping end portions each including radially extending, serrated friction grip means adapted to be frictionally engaged with the surfaces of elements placed adjacent thereto, said washer having a thickness in an axial direction along the portions of overlapping ends that is slightly greater than the thickness of the washer at other locations around the circumference thereof, the condition of the said faces of the washer end portions being such that the coefficient of friction between said friction grip means and the material engaged therewith is greater than the coefficient of friction between the slidably engaged, inwardly disposed faces of the washer end portions, said overlapping end portions of said washer having the free ends thereof normally positioned along the said inclined plane between the outwardly disposed faces of the washer.

3. A lock washer adapted to be mounted on a threaded member comprising a split ring of flexible material having bevel cut, overlapping, end portions each of which is formed with opposed, inwardly and outwardly disposed faces, said inwardly disposed faces of the washer end portions being frictionally and slidably engageable along an inclined plane extending between the outwardly disposed faces of the lock washer wherein the plane inclination is in the same direction as but is of greater degree than the pitch of the threads of the threaded member on which the washer is mounted, said outwardly disposed faces of said washer overlapping end portions each including radially extending, serrated friction grip means adapted to be frictionally engaged with the surfaces of elements placed adjacent thereto, said washer having a thickness in an axial direction along the portions of overlapping ends that is slightly greater than the thickness of the washer at other locations around the circumference thereof, the condition of the said faces of the washer end portions being such that the coefficient of friction between said friction grip means and the material engaged therewith is greater than the coefficient of friction between the slidably engaged, inwardly disposed faces of the washer end portions, said overlapping end portions of said washer having the free ends thereof normally positioned along the said inclined plane between the outwardly disposed faces of the washer, and portions of reduced cross sectional configuration along the periphery of the washer intermediate the overlapped end portions thereof.

4. A lock washer adapted to be mounted on a threaded member comprising a split ring of flexible material having overlapping end portions each of which is formed with opposed, inwardly and outwardly disposed faces, said inwardly disposed faces of the washer end portions being slidably engageable along an inclined plane extending between the outwardly disposed faces of the lock washer wherein the plane inclination is in the same direction as but is of greater degree than the pitch of the threads of the threaded member on which the washer is mounted, said inclined plane providing a ramp means adapted to vary the axial thickness of the washer at the overlapped end portions, said outwardly disposed faces of said washer overlapping end portions each including radially extending serrations adapted to be frictionally engaged with the surfaces of elements placed adjacent thereto, the serrations on the said overlaping outwardly disposed faces of the washer end portions being angled in opposite directions, said washer having a thickness in an axial direction along the portions of overlaping ends that is slightly greater than the thickness of the washer at other locations around the circumference thereof, the condition of the said faces of the washer end portions being such that the coefficient of friction between said serrations and the material engageable therewith is greater than the coefficient of friction between the slidably engaged inwardly disposed faces of the washer end portions.

5. A lock washer adapted to be mounted on a threaded member comprising a split ring of flexible material having overlapping end portions each of which is formed with opposed, inwardly and outwardly disposed faces, said inwardly disposed faces of the washer end portions being sliadbly engageable along an inclined plane extending between the outwardly disposed faces of the lock washer wherein the plane inclination is in the same direction as but is of greater degree than the pitch of the threads of the threaded member on which the washer is mounted, said inclined plane providing a ramp means adapted to vary the axial thickness of the washer at the overlapped end portions, said outwardly disposed faces of said washer overlapping end portions each including radially extending serrations adapted to be frictionally engaged with the surfaces of elements placed adjacent thereto, the serrations on the said overlapping outwardly disposed faces of the washer end portions being angled in opposite directions, said washer having a thickness in an axial direction along the portions of overlapping ends that is slightly greater than the thickness of the washer at other locations around the circumference thereof, the condition of the said faces of the washer end portions being such that the coefficient of friction between said serrations and the material engageable therewith is greater than the coefficient of friction between the slidably engaged inwardly disposed faces of the washer end portions, said overlapping ends of the washer having the free end portions thereof normally positioned along the said inclined plane between said outwardly disposed faces of the washer.

6. A locker washer adapted to be mounted on a threaded member comprising a split ring of flexible material having overlapping, angularly related, end portions each of which is formed with inwardly and outwardly disposed, opposed faces, said inwardly disposed faces of the washer end portions being slidably engageable along an inclined plane that provides a wedge ramp extending between the outwardly disposed faces of the lock washer, said inclined plane being inclined in the same direction as but to a greater degree than the pitch of the threads of the threaded member on which the washer is to be mounted, said outwardly disposed faces of said washer overlapping end portions each including serrations adapted to be frictionally engaged with the surfaces of elements placed adjacent thereto, said washer having a thickness in an axial direction along the wedge ramp that is slightly greater than the thickness of the washer at other locations around the circumference thereof, the serrations providing means that cooperate with the surfaces engaged therewith such that the coefficient of friction along the outwardly disposed faces of the washer end portions is greater than the coefficient of friction between the slidably engaged inwardly disposed faces of the washer end portions.

SYDNEY L. TERRY.

REFERENCES CITED

The following references are of record in the file of this patent:

UNITED STATES PATENTS

| Number | Name | Date |
| --- | --- | --- |
| 348,569 | McHugh | Sept. 7, 1886 |
| 447,738 | Pritschau | Mar. 3, 1891 |
| 1,220,983 | Haptonstall | Nov. 9, 1937 |
| 2,098,840 | Thode | Nov. 9, 1937 |

FOREIGN PATENTS

| Number | Country | Date |
| --- | --- | --- |
| 459,063 | Germany | Apr. 24, 1923 |
| 489,221 | Germany | Jan. 15, 1930 |
| 611,578 | France | Mar. 29, 1927 |